Oct. 19, 1971     J. G. STROUP     3,613,116

DRIBBLE TEACHING AID

Filed April 23, 1969

INVENTOR.
JAMES G. STROUP

BY

*Dunlap, Toney, Hessin & Dougherty*
ATTORNEYS

United States Patent Office 3,613,116
Patented Oct. 19, 1971

3,613,116
DRIBBLE TEACHING AID
James G. Stroup, 1501 Pawnee, Enid, Okla. 73701
Filed Apr. 23, 1969, Ser. No. 818,767
Int. Cl. A61f 9/04
U.S. Cl. 2—12
7 Claims

ABSTRACT OF THE DISCLOSURE

A teaching aid apparatus for basketball dribbling instruction, the apparatus consisting of a horizontal blinding panel having one edge contoured to fit against a basketball player's face to block downward vision, the apparatus also including brace means for maintaining the blinder panel firmly at a predetermined position relative to the player's nose while a suitable headband holds the blinder apparatus firmly against the face.

BACKGROUND OF THE INVENTION

(1) Field of the invention

The invention relates generally to athletically oriented tactile teaching aids and, more particularly, but not by way of limitation, it relates to an improved vision limiting device for use in improving the tactile senses relative to the dribbling and ball-handling of a basketball.

(2) Description of the prior art

The prior art includes several forms of blinder or eye shade device which may be employed on or about a persons head to carry out whatever its intended function. However, none of the prior art schemes teach or even allude to a ruggedized vision blocking panel which can be firmly anchored in operative position on an athlete's face during competitive activity. The majority of such prior art teachings are directed mainly to light-blocking or eye-shadowing function, which functions necessitate a largely different panel structure and method of affixure on the subject's face. One prior art Patent No. 1,152,431 should be noted as this serves as a teaching aid for teaching blind hand piano skills; however, the actual and intended structure is extremely fragile such that its usage would be limited to a very narrow line of relatively passive applications.

SUMMARY OF THE INVENTION

The present invention contemplates a basketball practice device for sharpening the acuity of tactile skills. In a more limited aspect, the invention consists of a vision blocking panel which is form-fit to be held in horizontal disposition against a subject's face by means of a suitable head strap, eye-glass attachment or whatever. A positioning brace is affixed below the blocking panel to be disposed below the subject's nose thereby to assure continual positioning of the vision blocking panel relative to the subject's nose.

Therefore, it is an object of the present invention to provide a teaching aid for use by athletes in sharpening the acuity of their manual tactile senses.

It is also an object of the invention to provide a blinding device for manual sense exercise which can be worn by a basketball player during competitive scrimmage.

It is still further an object of the invention to provide such tactile training aid which is rugged of structure and which can be reliably worn and maintained on a basketball player's face during active practice competition.

Finally, it is an object of the present invention to provide a basketball training aide which serves to increase the dribbling proficiency of a basketball player.

Other objects and advantages of the invention will be evident from the following detailed description when read in conjunction with the accompanying drawings which illustrate the invention.

DETAILED DESCRIPTION OF THE PREFERRED EMBODIMENT

Figure 1:
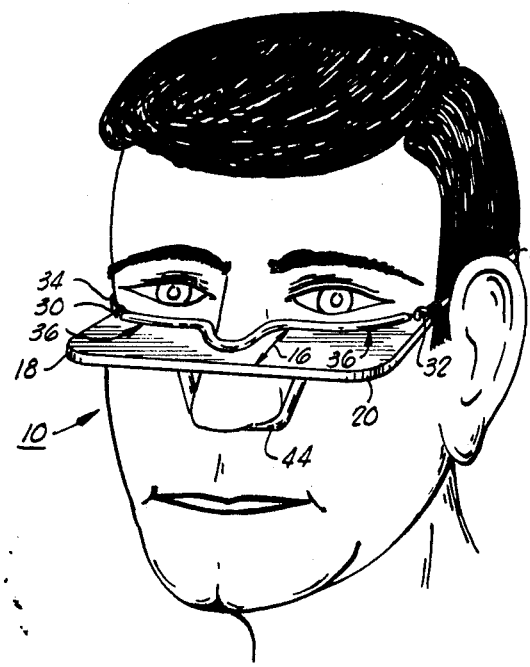
FIG. 1 is a view in perspective of the invention as worn by an athlete.

As shown in FIG. 1, a teaching aid 10 is worn by a subject 12 so that it is held in firm positioning across the subject's face and below his eyes to block downward vision, either direct or peripheral vision. The teaching aid 10 consists of a vision blocking panel 14 which may be shaped generally as shown in FIG. 1. The panel 14 may be formed from various materials but, primarily, desirable light reflective characteristics should be considered, i.e. a subdued reflection of light from above. Thus, vision blocking panel 14 is formed to be of sufficient width in the dimension of arrow 16 such that it serves the vision blocking function adequately, and corners 18 and 20 are suitably rounded off and brought back to corners 22 and 24 for affixture with fastening structure.

The corners 22 and 24 are each formed with holes 26 and 28 formed therethrough for receiving respective connecting rings 30 and 32. A headband 34, which may be a suitable resilient strap, is then secured to the connecting rings 30 and 32, head band 34 serving to seat securely about the rear of the head of subject 12. A contact edge 36 of teaching aid 10 is suitably shaped to provide a reasonably close form fit when in operative juxtaposition to the face of subject 12. Thus, curved portions 38 and 40 are formed to provide an approximate fit relative to the cheek bones of subject 12, while a centrally curved portion 42 is formed to fit around the nose, i.e. it rides approximately across the center of bridge of the nose of subject 12.

Figure 3:
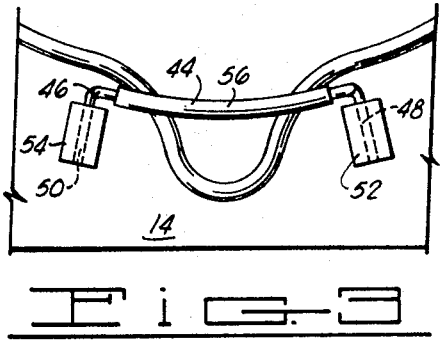
FIG. 3 is a partial bottom view illustrating the nose attachment structure.
Figure 2:
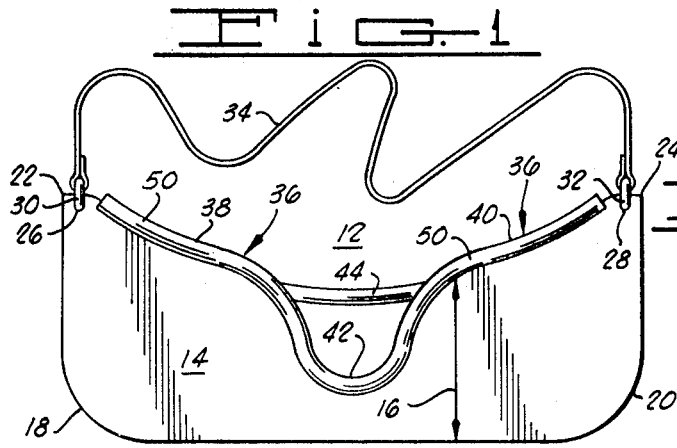
FIG. 2 is a top plan view of the dribble teaching aid of the invention.

A nose support strutcure 44, see also FIGS. 2 and 3, is secured to the underside of panel 14 (as will be described) so that it seats securely beneath the nostrils of subject 12. The nose support structure 44 serves to maintain the panel 14 in proper sight-blocking position during the most strenuous and severe moves of the subject 12.

As shown in FIG. 3, the nose support 44 is formed by a U-shaped wire member 46 having a pair of securing ends 48 and 50 formed on opposite ends. The securing ends 48 and 50 may then be secured in place by such as securing blocks 52 and 54 which are bonded to the underside of panel 14. A length of tubing 56 formed from suitable resilient material is disposed to cover the broad portion of U-shaped wire member 46 to provide a cushioning surface which bears against the underside of the nose or the nostril area of subject 12.

Figure 4:
FIG. 4 is a sectional view through a contact edge of the dribble teaching aid.

FIG. 4 illustrates a section as taken through the contact edge 36. The panel 14 may be formed from any suitable form of plastic or metal fabricating material having an edge 58 formed generally in the pattern of contact edge 36 and, thereafter, a cushion strip 60 is secured thereon by a suitable bonding agent. In one form, cushion strip 60 is formed from a length of heavy-walled, resilient, rubber tubing which is cut along one side and inserted over the edge 58 of panel 14. Bonding may be carried out by any of numerous cements or bonding agents which are compatible with the materials to be joined.

Figure 5:
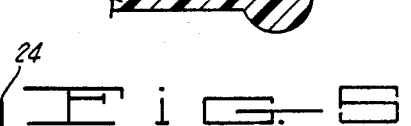
FIG. 5 is an alternative form of contact edge which may be employed.
Figure 6:
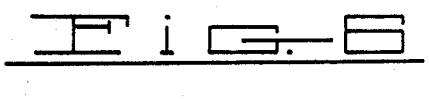
FIG. 6 is a sectional view of still another form of contact edge.

It should be understood too, that certain variations in structure may be selected as a matter of design expediency. Thus, as illustrated by the section of FIG. 5, a contact edge 62 may be unitarily formed in a single molding process by forming a bead edge 64 along the vision-blocking panel 66. FIG. 6 illustrates still another form of structure for contact edge 68 which consists of a panel member such as 14 having a resilient strip 70 bonded around the top surface thereof. The resilient strip 70 may be formed from very soft rubber material and it may have such as a tapered portion 72 formed thereon for providing comfortable abutment against the cheeks and nose of subject 12.

Figure 7:
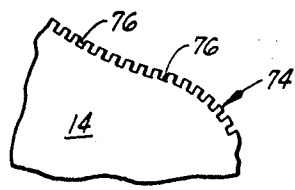
FIG. 7 is a sectional view of yet another form contact edge which may be employed.

FIG. 7 shows still another form of contact edge 74 wherein the panel 14 is formed to have a plurality of parallel-disposed slots 76 formed therein. The use of a contact edge 74 may prove to be an aide in alleviating certain perspiration problems, especially for those who may be required to wear eyeglasses, and the particular structure has the further advantage of being moldable in unitary procedure. It is well within contemplation that a variation of teaching aid 10 may be constructed as an attachment for spectacles.

It is planned that the entire teaching aid 10 may be molded by conventional techniques for formation in one or two parts for final assembly. While various simplification techniques may be employed, structure generally adhering to that depicted in FIGS. 1–4 provide maximum stability and comfort to the wearer or subject 12 during most violent contact in actual scrimmage conditions.

The foregoing discloses a studry training aid which can be used by a basketball player to increase his tactile acuity in dribbling and ball-handling. The invention is susceptible of rugged, compact construction which can be firmly and reliably positioned on the face of the practicing ball player with little or no danger of dislocation, injury or even breakage during actual scrimmage contact. It should be understood that any specification of materials set forth herein is merely by way of example and that very many plastics, fiber materials, metals, etc. may be employed in constructing the dribble teaching aid device; it should also be understood that the physical dimensions and overall design of the device may be varied within wide limits.

Changes may be made in the combination and arrangement of elements as heretofore set forth in the specification and shown in the drawings; it being understood that changes may be made in the embodiments disclosed without departing from the spirit and scope of the invention.

What is claimed is:

1. A tactile acuity training device to be worn on the face of a practicing subject for basketball dribbling instruction, comprising:

a substantially planar panel means having a contact edge with a contour formed to fit generally horizonally across the cheek bones and nose bridge of the subject, said contact edge being formed as a rounded, unabrasive edge for comfortable contact across the face;

nose support means in the form of a U-shaped member having a horizontal portion with opposite vertical ends, each of said opposite vertical ends being affixed to the underside of said panel means generally adjacent said nose bridge contour portion such that said horizontal portion is disposed to bear upon the under side of the nose of the subject, said vertical ends extending approximately as high as one-half the height of the nose of the subject such that the training device is held firmly across the bridge of the nose at about the mid-point; and resilient strap means secured pivotally to opposite sides of said panel means, said strap means being adjustable in length and able to maintain said panel means in horizontal disposition on the face with said contact edge in continually bearing relationship against the cheek bones and nose bridge of the subject.

2. A device as set forth in claim 1 wherein said panel means includes: cushion means formed of resilient material and being affixed to said panel member about said contact edge to provide resilient, tight contact with cheek bone and nose bridge areas of the subject.

3. A device as set forth in claim 1 wherein said nose support means includes: resilient means formed on the central portion of siad U-shaped member to provide resilient cushioning against the underside of the nose of the subject.

4. A device as set forth in claim 1 wherein said panel means is formed from material having minimal light reflective characteristics.

5. A device as set forth in claim 3 wherein said panel means is formed from material having minimal light reflective characteristics.

6. A device as set forth in claim 1 wherein said panel means comprises: a panel member having an enlarged bead portion unitarily formed along said contact edge.

7. A device as set forth in claim 1 wherein said panel means comprises: a panel member having a plurality of slots formed in comb-like array along said contact edge.

References Cited
UNITED STATES PATENTS

| | | | |
|---|---|---|---|
| 888,945 | 5/1908 | Wade et al. | 2—12 |
| 1,585,023 | 5/1926 | Fant | 2—12 X |
| 1,923,340 | 8/1933 | Steckler | 2—174 |
| 2,491,217 | 12/1949 | Schlumbohm | 2—12 |
| 2,721,322 | 10/1955 | Harper | 2—12 |

H. HAMPTON HUNTER, Primary Examiner